M. E. Mead,

Ventilator.

No. 4,255. Reissued Feb. 7. 1871.

Fig. 2,

Witnesses:
L. S. Moabe
alex. F. Roberts

Inventor:
M. E. Mead
per Munn & Co
Attorneys.

N. PETERS, PHOTO-LITHOGRAPHER, WASHINGTON, D. C.

United States Patent Office.

MELVILLE E. MEAD, OF DARIEN DEPOT, CONNECTICUT.

Letters Patent No. 90,180, dated May 18, 1869; reissue No. 4,255, dated February 7, 1871.

IMPROVEMENT IN VENTILATORS.

The Schedule referred to in these Letters Patent and making part of the same.

*To all whom it may concern:*

Be it known that I, MELVILLE E. MEAD, of Darien Depot, in the county of Fairfield and State of Connecticut, have invented a new and improved Automatic Ventilator; and I do hereby declare that the following is a full, clear, and exact description thereof which will enable others skilled in the art to make and use the same, reference being had to the accompanying drawing forming part of this specification.

The present invention relates to a new and improved automatic ventilator for dwellings, stables, chimneys, &c., the object of which is by so connecting the slats on the opposite sides by rods running across between them, that the said slats may be simultaneously operated upon and closed by the force of the wind blowing against them on the windward side, and opened on the leeward side, thus enabling the ventilator to be kept open at all times on the leeward side, the construction and operation of which will be understood from the following description, reference being had to the accompanying drawing forming part of this specification, in which—

Figure 2 represents a side elevation of the same.

Similar letters of reference indicate corresponding parts.

Figure 1:
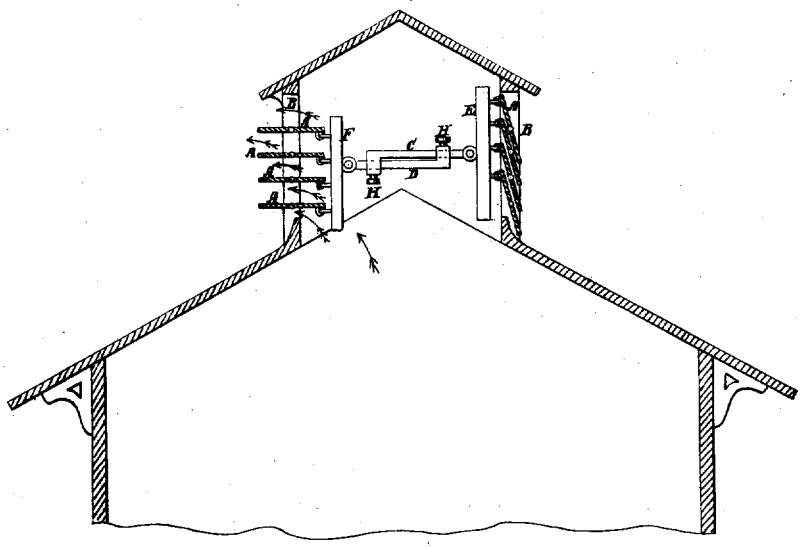
Figure 1 represents a cross-section through the line *x x*.
Figure 1:
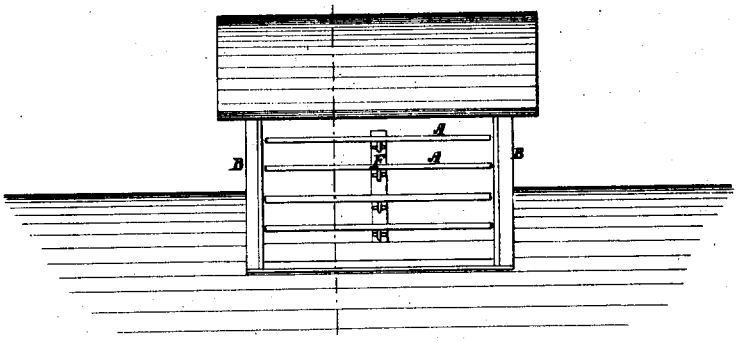

In this case the slats A are pivoted to the frame B in such a manner that their overhang will serve to counterbalance the weight of the rods C and D, which are secured to and connect the said slats of each side.

These rods C and D are hinged respectively to the uprights E and F, which are hinged in the usual manner to the slats A, the said rods being constructed with eyes G G on their inner ends, through which they pass, and support themselves, as shown in the drawing.

The amount of ventilation required is thus regulated by moving these rods C and D backward and forward, and they are held in such position by clamping the same with the thumb-screws H H.

If it is not desired to vary the openings of the slats a single rod will serve in place of the two parts C and D.

Having thus described my invention,

I claim as new and desire to secure by Letters Patent—

The automatic ventilator, consisting of the two oppositely-arranged series of pivoted slats, connected by one or more rods or bars, whereby they are adapted to operate substantially in the manner herein set forth, for the purpose specified.

MELVILLE E. MEAD.

Witnesses:

GEO. W. MABEE,

ALEX. F. ROBERTS.